United States Patent
Upadhye et al.

(10) Patent No.: US 12,086,792 B2
(45) Date of Patent: Sep. 10, 2024

(54) TOKENIZED CONTROL OF PERSONAL DATA

(71) Applicant: VOCALINK LIMITED, London (GB)

(72) Inventors: Nilesh Upadhye, Chelmsford (GB); Joseph Hayes, Montclair, NJ (US)

(73) Assignee: VOCALINK LIMITED, London (GB)

( * ) Notice: Subject to any disclaimer, the term of this patent is extended or adjusted under 35 U.S.C. 154(b) by 270 days.

(21) Appl. No.: 17/580,489

(22) Filed: Jan. 20, 2022

(65) Prior Publication Data

US 2023/0230067 A1  Jul. 20, 2023

(51) Int. Cl.
*G06Q 20/36* (2012.01)
*G06Q 20/38* (2012.01)
*G06Q 20/40* (2012.01)
*G06Q 20/02* (2012.01)

(52) U.S. Cl.
CPC ....... *G06Q 20/363* (2013.01); *G06Q 20/3821* (2013.01); *G06Q 20/401* (2013.01); *G06Q 20/4016* (2013.01); *G06Q 20/02* (2013.01); *G06Q 20/382* (2013.01); *G06Q 20/40975* (2013.01); *G06Q 2220/00* (2013.01)

(58) Field of Classification Search
None
See application file for complete search history.

(56) References Cited

U.S. PATENT DOCUMENTS 9,723,485 B2 * 8/2017 Jones-Mcfadden .... G06Q 20/36
11,574,312 B2 * 2/2023 Hammad ................ H04L 9/321
(Continued)

FOREIGN PATENT DOCUMENTS

AU  2014321178 A1 * 4/2016 ............. G06Q 20/12
CA  3052074 A1 * 8/2018 ............. G06Q 20/00
(Continued)

OTHER PUBLICATIONS

W. Ahmed et al., "Security in Next Generation Mobile Payment Systems: A Comprehensive Survey," in IEEE Access, vol. 9, pp. 115932-115950, 2021. https://ieeexplore.ieee.org/document/9514868?source=IQplus (Year: 2021).*
(Continued)

*Primary Examiner* — El Mehdi Oussir
(74) *Attorney, Agent, or Firm* — Barta Jones, PLLC

(57) ABSTRACT

A method for managing personal data is disclosed. A request for an identifier (ID) token corresponding to a user is received from a virtual wallet. The ID token is generated and transmitted to the virtual wallet, where the ID token is presented to a third-party entity by a device of the user. A request for the personal data corresponding to the ID token is received from the third-party entity. A trustworthiness score for the third-party entity is determined based at least in part on an analysis of entity data corresponding to the third-party entity. The trustworthiness score and received request are transmitted to the virtual wallet and passed on to the user device. An indication of acceptance of the request and encrypted personal data associated with the generated ID token are received from the virtual wallet and transmitted to the third-party entity for processing.

20 Claims, 8 Drawing Sheets

(56) References Cited

U.S. PATENT DOCUMENTS

| | | | |
|---|---|---|---|
| 11,769,152 B2 * | 9/2023 | Kumar | G06Q 20/3674 |
| | | | 705/75 |
| 2014/0025958 A1 * | 1/2014 | Calman | G06F 21/33 |
| | | | 713/189 |
| 2017/0006028 A1 * | 1/2017 | Tunnell | H04W 12/06 |
| 2017/0011395 A1 * | 1/2017 | Pillai | G06Q 20/40 |
| 2017/0024723 A1 * | 1/2017 | Filler | G06F 3/04842 |
| 2017/0046679 A1 * | 2/2017 | Gotlieb | G06Q 20/34 |
| 2017/0103388 A1 * | 4/2017 | Pillai | G06Q 20/3227 |
| 2017/0109742 A1 * | 4/2017 | Varadarajan | G06F 21/32 |
| 2017/0169430 A1 * | 6/2017 | De Magalhaes | G06Q 20/3672 |
| 2017/0193543 A1 * | 7/2017 | Priebatsch | G06Q 20/202 |
| 2017/0232300 A1 * | 8/2017 | Tran | G06F 1/163 |
| | | | 434/247 |
| 2017/0236196 A1 * | 8/2017 | Isaacson | G06Q 20/12 |
| | | | 705/14.51 |
| 2017/0243213 A1 * | 8/2017 | Castinado | H04W 12/06 |
| 2018/0012227 A1 * | 1/2018 | Tunnell | G06Q 20/40145 |
| 2018/0053157 A1 * | 2/2018 | Roffey | G06K 19/06206 |
| 2018/0108008 A1 * | 4/2018 | Chumbley | G06Q 20/326 |
| 2018/0150832 A1 * | 5/2018 | Badal-Badalian | |
| | | | G06Q 20/3276 |
| 2018/0336553 A1 * | 11/2018 | Brudnicki | G06Q 20/3227 |
| 2019/0141021 A1 * | 5/2019 | Isaacson | G06Q 30/0625 |
| 2019/0147515 A1 * | 5/2019 | Hurley | G06Q 20/3821 |
| | | | 705/44 |
| 2019/0236594 A1 * | 8/2019 | Ehrlich-Quinn | G06Q 20/401 |
| 2019/0306137 A1 * | 10/2019 | Isaacson | G06Q 20/20 |
| 2019/0333055 A1 | 10/2019 | Mohammed | |
| 2019/0361917 A1 * | 11/2019 | Tran | H04W 12/108 |
| 2019/0363889 A1 * | 11/2019 | Wang | H04L 9/3236 |
| 2020/0027066 A1 * | 1/2020 | Ramasamy | G06Q 20/3825 |
| 2020/0036695 A1 * | 1/2020 | Sharp | G06Q 20/326 |
| 2020/0082402 A1 * | 3/2020 | Patel | G06Q 20/405 |
| 2020/0382480 A1 * | 12/2020 | Isaacson | G06Q 20/384 |
| 2020/0387887 A1 * | 12/2020 | Rathod | G06Q 20/3224 |
| 2021/0004454 A1 * | 1/2021 | Chester | H04L 63/0807 |
| 2021/0133735 A1 * | 5/2021 | Maim | G06Q 20/06 |
| 2021/0174426 A1 * | 6/2021 | Isaacson | G06Q 20/12 |
| 2021/0327189 A1 * | 10/2021 | Jarvis | G06Q 50/265 |
| 2022/0058651 A1 * | 2/2022 | Vittimberga | G06Q 20/4014 |
| 2022/0114593 A1 * | 4/2022 | Johnson | G06F 18/24133 |
| 2022/0114594 A1 * | 4/2022 | Nunes | G06Q 20/4016 |
| 2022/0383305 A1 * | 12/2022 | Smith | G06Q 20/3827 |
| 2023/0206329 A1 * | 6/2023 | Cella | G06F 16/906 |
| 2023/0368190 A1 * | 11/2023 | Baruvoori | G06Q 20/4097 |

FOREIGN PATENT DOCUMENTS

| | | | | |
|---|---|---|---|---|
| CA | 2897145 C | * | 10/2023 | G06F 21/34 |
| CN | 105190659 A | * | 12/2015 | G06Q 20/105 |
| CN | 103814390 B | * | 6/2016 | G06F 21/51 |
| CN | 107004195 A | * | 8/2017 | G06Q 20/027 |
| CN | 107438992 A | * | 12/2017 | G06Q 20/027 |
| CN | 103765454 B | * | 2/2018 | G06Q 20/02 |
| CN | 108463825 A | * | 8/2018 | G06F 21/32 |
| CN | 109691016 A | * | 4/2019 | G06Q 40/02 |
| CN | 109863519 A | * | 6/2019 | G06Q 20/227 |
| CN | 110383757 A | * | 10/2019 | G06F 21/32 |
| CN | 110494877 A | * | 11/2019 | G06F 16/27 |
| CN | 110892676 A | * | 3/2020 | H04L 63/0807 |
| CN | 111279336 A | * | 6/2020 | G06F 16/951 |
| CN | 111386514 A | * | 7/2020 | G06F 21/32 |
| CN | 111602116 A | * | 8/2020 | G06F 21/32 |
| CN | 107408253 B | * | 8/2021 | G06Q 20/02 |
| CN | 109417574 B | * | 10/2021 | H04L 63/06 |
| CN | 109417549 B | * | 11/2021 | G06Q 20/02 |
| CN | 114648333 A | * | 6/2022 | G06Q 20/32 |
| EP | 3460692 A1 | * | 3/2019 | B60R 25/24 |
| KR | 20190014509 A | * | 3/2012 | |
| KR | 20180026498 A | * | 7/2016 | |
| KR | 20190089861 A | * | 12/2016 | |
| KR | 101834367 B1 | * | 1/2017 | |
| KR | 20180100369 A | * | 1/2017 | |
| WO | WO-2016134016 A1 | * | 8/2016 | G06Q 20/223 |
| WO | WO-2018167570 A2 | * | 9/2018 | G06F 21/31 |
| WO | WO-2021081408 A1 | * | 4/2021 | G06F 16/24575 |
| WO | WO-2022115098 A1 | * | 6/2022 | G06Q 20/027 |
| WO | WO-2022159345 A1 | * | 7/2022 | G06F 21/35 |

OTHER PUBLICATIONS

W. Liu, X. Wang and W. Peng, "State of the Art: Secure Mobile Payment," in IEEE Access, vol. 8, pp. 13898-13914, 2020. https://ieeexplore.ieee.org/document/8947955?source=IQplus (Year: 2020).*

Priyanu, Pakpum T., "International Search Report and Written Opinion", International Application No. PCT/EP2022/086561, mailed Apr. 13, 2023, 13 pages.

* cited by examiner

TOKENIZED CONTROL OF PERSONAL DATA

BACKGROUND

Many businesses and companies push a digital first strategy, which requires the collection and management of consumer's personal data. This results in consumers having less control over their own data and ending up with multiple copies of personal data shared with various business entities. Furthermore, it is complicated to refresh or update personal data, such as a location or address with all the business entities. Also, there is no viable and seamless technical control by the consumer to enforce businesses to recycle consumer data without a complicated business process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various implementations of the present disclosure described herein are directed to systems and methods that manage personal data of a user. In an example implementation, a method is provided that comprises receiving, from a virtual wallet, a request for an identifier (ID) token corresponding to the user; generating the ID token; transmitting the generated ID token to the virtual wallet, wherein the generated ID token is presented to a third-party entity by a device of the user; receiving, from the third-party entity, a request for the personal data corresponding to the ID token; determining a trustworthiness score corresponding to the third-party entity based at least in part on an analysis of entity data corresponding to the third-party entity; transmitting the trustworthiness score and the received request to the virtual wallet, wherein the virtual wallet sends the transmitted trustworthiness score and the received request to the device of the user; receiving, from the virtual wallet, an indication of acceptance or denial of the request from the third-party entity; responsive to receiving the indication of acceptance of the request, receiving encrypted personal data associated with the generated ID token from the virtual wallet; and transmitting the encrypted personal data to the third-party entity for processing.

In another implementation, a system for managing personal data of a user is provided. The system comprises at least one processor, at least one communications interface, and a memory storing instructions. The instructions, when executed by the at least one processor, cause the at least one processor to control the at least one communications interface to receive, from a virtual wallet, a request for an identifier (ID) token corresponding to the user; generate the ID token; control the at least one communications interface to transmit the generated ID token to the virtual wallet, wherein the generated ID token is presented to a third-party entity by a device of the user; control the at least one communications interface to receive, from the third-party entity, a request for the personal data corresponding to the ID token; determine a trustworthiness score corresponding to the third-party entity based at least in part on an analysis of entity data corresponding to the third-party entity; control the at least one communications interface to transmit the trustworthiness score and the received request to the virtual wallet, wherein the virtual wallet sends the transmitted trustworthiness score and the received request to the device of the user; control the at least one communications interface to receive, from the virtual wallet, an indication of acceptance or denial of the request from the third-party entity; responsive to receiving the indication of acceptance of the request, control the at least one communications interface to receive encrypted personal data associated with the generated ID token from the virtual wallet; and control the at least one communications interface to transmit the encrypted personal data to the third-party entity for processing.

In another implementation, a computer readable medium storing instructions for managing personal data is provided. The instructions, when executed by a processor, cause the processor to receive, from a virtual wallet, a request for an identifier (ID) token corresponding to the user; generate the ID token; transmit the generated ID token to the virtual wallet, wherein the generated ID token is presented to a third-party entity by a device of the user; receive, from the third-party entity, a request for the personal data corresponding to the ID token; determine a trustworthiness score corresponding to the third-party entity based at least in part on an analysis of entity data corresponding to the third-party entity; transmit the trustworthiness score and the received request to the virtual wallet, wherein the virtual wallet sends the transmitted trustworthiness score and the received request to the device of the user; receive, from the virtual wallet, an indication of acceptance or denial of the request from the third-party entity; responsive to receiving the indication of acceptance of the request, receive encrypted personal data associated with the generated ID token from the virtual wallet; and transmit the encrypted personal data to the third-party entity for processing.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
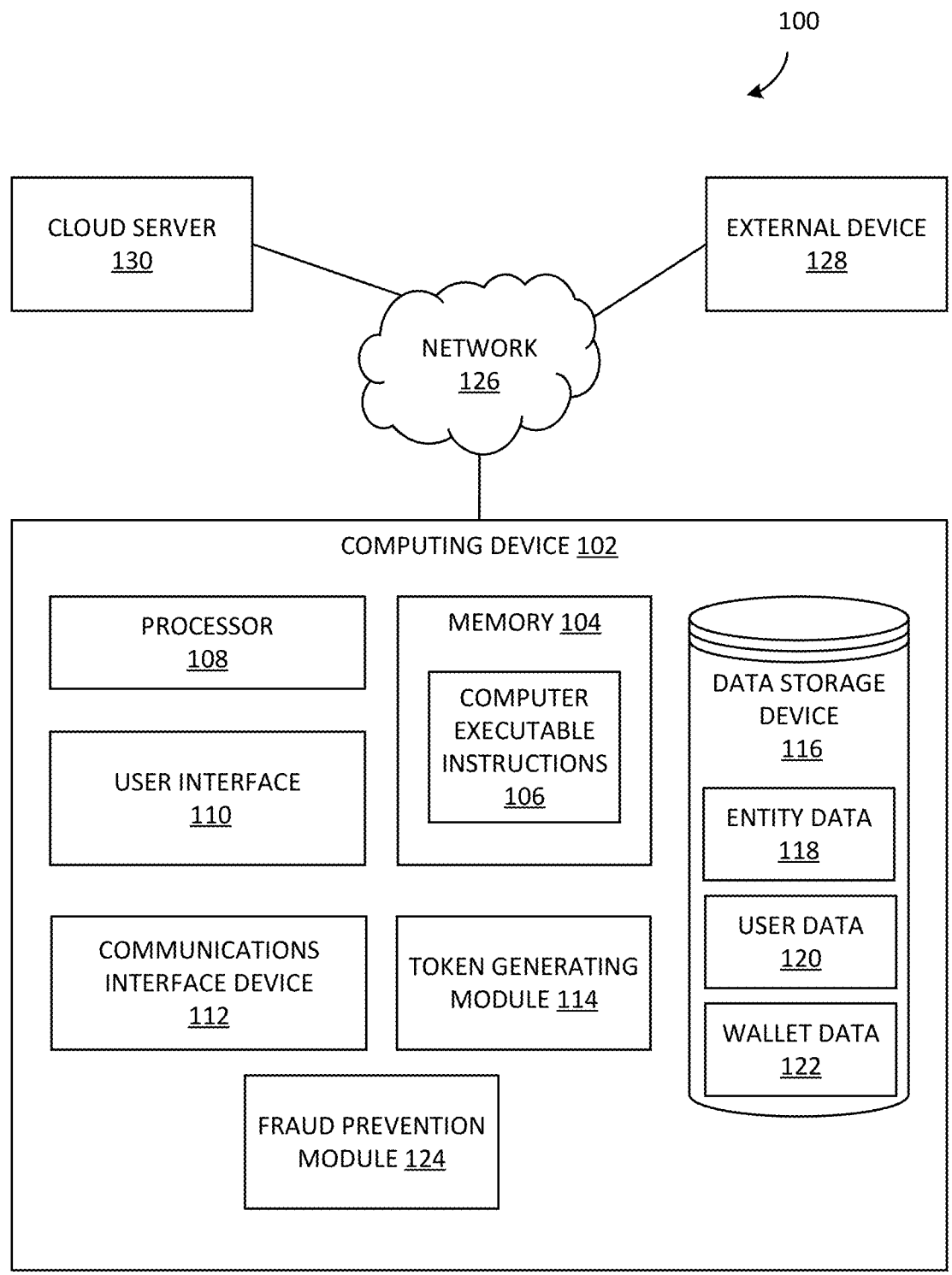
FIG. 1 is a block diagram illustrating an example system for managing an identifier (ID) token.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As referenced herein, personal data (e.g., user data) is personal information (PI) data corresponding to a particular user, or consumer. The personal data can include but is not limited to a first name, last name, gender, date of birth, current address, previous addresses, mobile number or numbers, telephone number or numbers, driver license information, passport information, bank account information, credit card numbers, electronic mail (e-mail) address or addresses, and social security numbers.

As described above, the collection and management of consumer's personal data presents challenges for consumers. From a consumer perspective, the consumer has less control over their own personal data, may have duplicate copies with a number of different businesses, may have difficulty refreshing data when the data changes, and has no viable technical control that allows the consumer to enforce personal data recycling. From a business perspective, this results in the loss of a considerable amount of transactions due to the amount of steps to collect prerequisite consumer personal information. Further, the data of customers is out of sync when the consumer data changes, and there are considerable expenses to establish business processes to manage the consumer data life cycle to comply with regulatory requirements.

Accordingly, various implementations of the present disclosure provide a technical solution including using an ID token and an unconventional communication and transformation of data that enables a consumer to control their own personal data sharing and manage the data life cycle with a third party. The ID token is compatible with multiple businesses, such as insurance companies, utility companies, online merchants, and online booking companies such as airline companies, hotel companies, and other hospitality companies. This enables business entities to seamlessly collect and manage consumer personal data as well as enables consumers to have a single view regarding who has access to their data and, in some instances, revoke access to one or more entities. The ID token presented herein can be implemented where a consumer and a business entity participate to leverage the ID token service to manage user data. The ID token can be managed by a network to map the virtual ID of a user to the wallet server. The ID token may not contain any sensitive or private information, but rather maps an ID to identify the corresponding user ID in the virtual wallet system. These implementations can utilize end to end encryption so the network, i.e., the ID token service provider, has no visibility or record of a user's personal data. In other words, only third-party business entities with which the user has provided consent are able to decrypt the user's personal data. In another implementation, a consumer requests an ID token that can be shared with a third-party business entity. In another implementation, a business entity pulls user data using a consumer shared ID token subject to consumer consent on requested user data. The consumer may either provide or decline consent, such as when the third-party requests more user data than is needed for the transaction. In another implementation, a business entity can request to pull refreshed information in due course to maintain updated information. In another implementation, a consumer can view a list of all ID tokens and corresponding business entities who have access to the user data on the ID token or tokens. In another implementation, a consumer can revoke access and notify a business entity to recycle currently held user data of the consumer.

FIG. 1 is a block diagram illustrating a system for managing an identifier (ID) token according to implementations of the present disclosure. The network environment 100 illustrated in FIG. 1 is provided for illustration only. Other examples of the network environment 100 can be used without departing from the scope of the present disclosure.

The network environment 100 includes a computing device 102, an external device 128, and a cloud server 130. Each of the computing device 102, the external device 128, and the cloud server 130 are communicatively coupled to and communicate via a network 126. The computing device 102 represents any device executing computer-executable instructions 106 (e.g., as application programs, operating system functionality, or both) to implement the operations and functionality associated with the computing device 102. The computing device 102, in some examples, includes a mobile computing device or any other portable device. A mobile computing device can include servers, desktop computers, kiosks, IoT devices, or tabletop devices. Additionally, the computing device 102 can represent a group of processing units or other computing devices. In some examples, the computing device 102 is a device executed in the cloud.

In some examples, the computing device 102 includes at least one processor 108, a memory 104 that includes the computer-executable instructions 106, and a user interface 110. The processor 108 includes any quantity of processing units, including but not limited to a CPU or units, a graphics processing unit (GPU) or units, and a neural processing unit (NPU) or units. The processor 108 is programmed to execute the computer-executable instructions 106. The computer-executable instructions 106 are performed by the processor 108, performed by multiple processors within the computing device 102, or performed by a processor external to the computing device 102. In some examples, the processor 108 is programmed to execute computer-executable instructions 106 such as those illustrated in the figures described herein, such as FIGS. 2-6. In various examples, the processor 108 is configured to execute one or more communications interface device 112, token generating module 114, data storage device 116, and fraud prevention module 124 as described in greater detail below. In other words, the communications interface device 112, token generating module 114, data storage device 116, and fraud prevention module 124 are implemented on and/or by the processor 108.

The memory 104 includes any quantity of media associated with or accessible by the computing device 102. The memory 104 in these examples is internal to the computing device 102, as illustrated in FIG. 1. In other examples, the memory 104 is external to the computing device 102 or both internal and external to the computing device 102. For example, the memory 104 can include both a memory component internal to the computing device 102 and a memory component external to the computing device 102. The memory 104 stores data, such as one or more applications. The applications, when executed by the processor 108, operate to perform various functions on the computing device 102. The applications can communicate with counterpart applications or services, such as web services accessible via the network 126. In an example, the applications represent downloaded client-side applications that correspond to server-side services executing in a cloud, such as the cloud server 130.

The user interface 110 includes a graphics card for displaying data to a user and receiving data from the user. The user interface 110 can also include computer-executable instructions, for example a driver, for operating the graphics card. Further, the user interface 110 can include a display, for example a touch screen display or natural user interface, and/or computer-executable instructions, for example a driver, for operating the display. In some examples, the touch screen display of the user interface 110 enables the user to select a network protocol to utilize for executing cross-device communication, as described in greater detail below. The user interface 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The communications interface device 112 includes a network interface card and/or computer-executable instructions, such as a driver, for operating the network interface card. Communication between the computing device 102 and other devices, such as but not limited to the cloud server 130, can occur using any protocol or mechanism over any wired or wireless connection. In some examples, the communications interface device 112 is operable with short range communication technologies such as by using near-field communication (NFC) tags.

The computing device 102 further includes a data storage device 116 for storing data, such as, but not limited to entity data 118, user data 120, and wallet data 122. The data storage device 116 in some non-limiting examples includes a redundant array of independent disks (RAID) array. In some examples, the stored entity data 118, user data 120, and/or wallet data 122 is the data to be transferred via cross-device communication using an available network protocol. For example, the stored entity data 118, user data 120, and/or wallet data 122 can be application data to be transferred via cross-device communication, which includes the size of the data, a type of data, an application type, a device type, and so forth.

The entity data 118 includes data for one or more third-party entities that have, previously had, or may in the future have access to the personal data of a user. In some implementations, the entity data 118 includes identifying information for a particular entity, including but not limited to addresses, email addresses, phone numbers, account numbers, and so forth. In some implementations, the entity data 118 includes additional data corresponding to particular entities, including but not limited to data protection policies, historical data protection data, data breach historical data, and previous transaction information.

The user data 120 includes the personal data corresponding to a particular user or consumer. As described above, the user data 120 can include but is not limited to a first name, last name, gender, date of birth, current address, previous addresses, mobile number or numbers, telephone number or numbers, driver license information, passport information, bank account information, credit card numbers, electronic mail (e-mail) address or addresses, and social security number of a particular user.

The wallet data 122 includes financial data corresponding to a particular user or consumer. For example, the wallet data 122 can include but is not limited to bank account information, credit card information, financial institution information, and so forth. In some implementations, the wallet data 122 includes some information also stored as the user data 120, such as bank account information and credit card numbers.

It should be understood that although the entity data 118, user data 120, and wallet data 122 are described as stored in the data storage device 116 of the computing device 102, various implementations are possible. In some implementations, the entity data 118 is stored separately from one or both of the user data 120 and the wallet data 122 in order to increase security of the storage of the data. For example, the entity data 118 can be stored in the data storage device 116, the user data 120 can be stored on the cloud server 130 or on an external device 128 such as the user's mobile phone, and the wallet data 122 is stored on the cloud server 130 or on an external device 128 such as a server of a financial institution.

The data storage device 116, in this example, is included within the computing device 102, attached to the computing device 102, plugged into the computing device 102, or otherwise associated with the computing device 102. In other examples, the data storage device 116 includes a remote data storage accessed by the computing device 102 via the network 126, such as a remote data storage device, a data storage in a remote data center, or a cloud storage.

In some implementations, the computing device 102 further includes the token generating module 114. The token generating module 114 is implemented on or by the processor 108 and generates and manages an identifier (ID) token. The ID token is specific to a particular user and enables access of personal data corresponding to the particular user to an entity or entities to whom the particular user has authorized access of the ID token. For example, the ID token can be associated with and enable access to personal data including, but not limited to, a first name, last name, gender, date of birth, current address, previous addresses, mobile number or numbers, telephone number or numbers, driver license information, passport information, bank account information, credit card numbers, electronic mail (e-mail) address or addresses, and social security number of the particular user.

In some implementations, the ID token is an alphanumeric sequence corresponding to an encrypted file, or files, that include the personal data corresponding to the user. As described in greater detail below, a user authorizes their particular ID token to be accessed by a particular entity. The user can select all of the personal data or select elements of the personal data associated with the ID token to be accessed by the particular entity. Thus, by providing the entity with the ID token and decryption key, the user is not required to send his or her personal data to the entity repeatedly. Instead, the entity is able to access the ID token when the personal data is required to be extracted, for example when processing a transaction between the entity and the user. In some implementations, the ID token is additionally used to update the entity's records of personal data of the user, for example when the personal data changes or is updated. In some implementations, the ID token is additionally used to recycle, or remove, the personal data of the user from the entity such that the personal data is no longer stored by the entity.

In some implementations, multiple entities each have access to the ID token simultaneously. For example, the user can authorize access for a first entity, a second entity, and so forth to the personal data of the ID token. Accordingly, the user is enabled to simultaneously update their personal data will multiple entities by updating the personal data associated with the ID token. This is in contrast to current solutions which require users to update personal data with each entity separately, which is time consuming and error prone.

In some implementations, each authorized entity has access to all of the personal data associated with the ID token. In other implementations, the different entities are provided access to different aspects of the personal data. For example, the user can select to share their first name, last name, date of birth, address, and drivers license information with an entity that is a car insurance provider, but select to share their first name, last name, address, and credit card number with an entity that processes a bill payment. In this example, the user selects to share only information that is pertinent to the particular entity with the entity. In other words, the drivers license information is pertinent to the car insurance provider but not pertinent to the bill payment processor, while the credit card number is pertinent to the bill payment processor but not pertinent to the car insurance provider.

In some implementations, the ID token is associated with personal data for an indefinite time period. In other words, the ID token is associated with specific personal data until the user requests the personal data no longer be associated with the ID token. In this example, the authorized entity or entities continue to have access to the personal data until the personal data is removed or authorization is revoked. In other implementations, the ID token is associated with the personal data until the expiration of a time limit. The time limit can be imposed by the user or by a regulatory authority. For example, some regulatory requirements establish a maximum time period for which an entity can store personal data.

Figure 2:
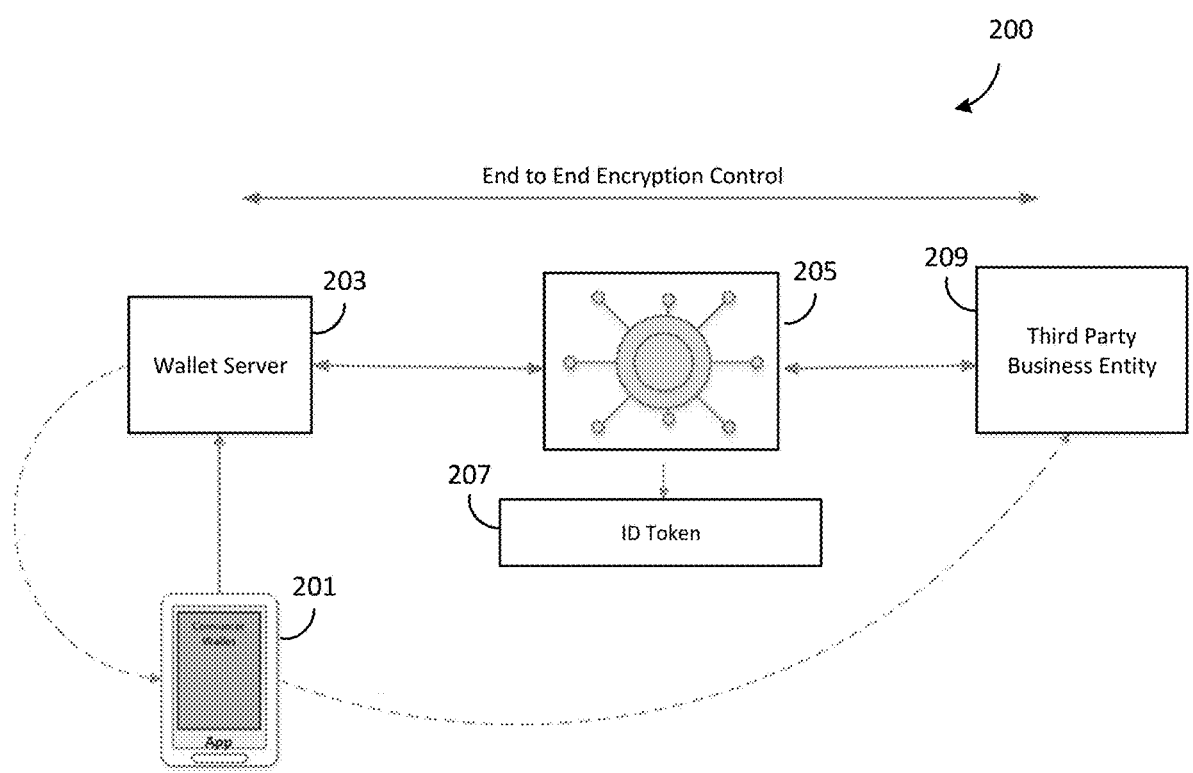
FIG. 2 is a block diagram illustrating an example system for managing an ID token.

FIG. 2 is a block diagram illustrating a system for managing an ID token according to implementations of the present disclosure. Various implementations of the system 200 for managing an ID token can be provided without departing from the scope of the present disclosure. For example, additional elements can be added, various elements can be omitted, and so forth.

The system 200 includes a user device 201, a virtual wallet server 203, a digitization platform 205, an ID token 207, and a third-party business entity 209. The user device 201 is a device utilized by a user or consumer. In some implementations, the user device 201 is an example of the external device 128. In some implementations, the user device 201 is a mobile computing device or any other portable device including, for example but without limitation, a mobile telephone, laptop, tablet, computing pad, netbook, gaming device, wearable device, Internet of Things (IoT) device, and/or portable media player. In other implementations, the user device 201 is a less-portable device such as a server, desktop computer, kiosk, IoT device, or tabletop device.

The user device 201 includes a user interface that presents a display to the user. In some implementations, the user interface presents a consumer wallet application to the user. In some implementations, the consumer wallet includes a client-side interface of the virtual wallet server 203. The consumer, or virtual, wallet application enables a user to input, remove, update, and otherwise manage personal data, such as the user data 120 described herein. For example, the consumer wallet application enables the user to input personal data, update personal data, and so forth. In some implementations, the consumer wallet application enables the user to communicate with external devices or applications, such as the virtual wallet server 203 and the third-party business entity 209. In some implementations, the consumer wallet application includes a list of entities who are currently authorized for sharing at least some of the user data 120.

The virtual wallet server 203 is a virtual wallet provided by one or more financial institutions. As referenced herein, a virtual wallet is an electronic wallet provided as an application on the user device 201 that stores payment related information of the particular user. For example, the virtual wallet can store bank account information for one or more bank accounts, credit card information for one or more credit card accounts, and so forth. In some implementations, the virtual wallet server 203 manages and stores the financial data presented on the user interface of the user device 201 in the consumer wallet. In other words, the consumer wallet presented on the user device 201 can include a client-side application of the virtual wallet managed by the virtual wallet server 203. In some implementations, the virtual wallet server 203 corresponds to a single financial institution. In other implementations, the virtual wallet server 203 corresponds to a plurality of, i.e., more than one, financial institutions.

The digitization platform 205 is a service provider that generates and provides the ID token. In some implementations, the digitization platform 205 is the computing device 102 described in greater detail above. The digitization platform 205 further provides a direct connection with each of the virtual wallet server 203 and the third-party business entity 209. In some implementations, the digitization platform 205 is a cloud server, such as the cloud server 130. In other implementations, the digitization platform 205 is an external device, such as the external device 128. For example, the digitization platform 205 can be a server, desktop computer, kiosk, IoT device, tabletop device, or any other suitable device.

In some implementations, the digitization platform 205 sends and receives requests to allow an issuer to push account information to a requestor of an ID token, such as the ID token 207 described in greater detail below. The digitization platform 205 can include an application programming interface (API) that provides the functionality described in greater detail herein. For example, the digitization platform 205 is a consumer- or user-facing API that is connected, or registered, with both the virtual wallet server 203 and one or more third-party business entities 209. As described herein, the digitization platform 205 interfaces with the virtual wallet server 203 and a third-party business entity 209 to process a transaction via the ID token 207, update personal data of a user of the virtual wallet server 203 with the third-party business entity 209 via the ID token 207, or instruct the third-party business entity 209 to recycle personal data associated with the ID token 207.

The digitization platform 205 generates the ID token 207. For example, the ID token 207 can be the ID token generated by the token generating module 114 described herein. As described herein, the ID token 207 includes an alphanumeric sequence identifying the particular consumer and is associated with the user data 120 and wallet data 122 of the user of the user device 201. In some implementations, the ID token 207 includes a consumer ID that identifies the particular user. In some implementations, the ID token 207 is flagged, or tagged, with a third-party ID corresponding to the third-party business entity 209 that requests the ID token 207.

The third-party business entity 209 is an entity requesting the personal data, i.e., the user data 120 of the user of the user device 201. In various implementations, the third-party business entity 209 can be a business processing a transaction, an insurance company, a financial institution, a government entity, a utility company, an online merchant, an airline company, a hotel company, a hospitality company, or any other third-party requesting personal data of a user or consumer.

Figure 3A:
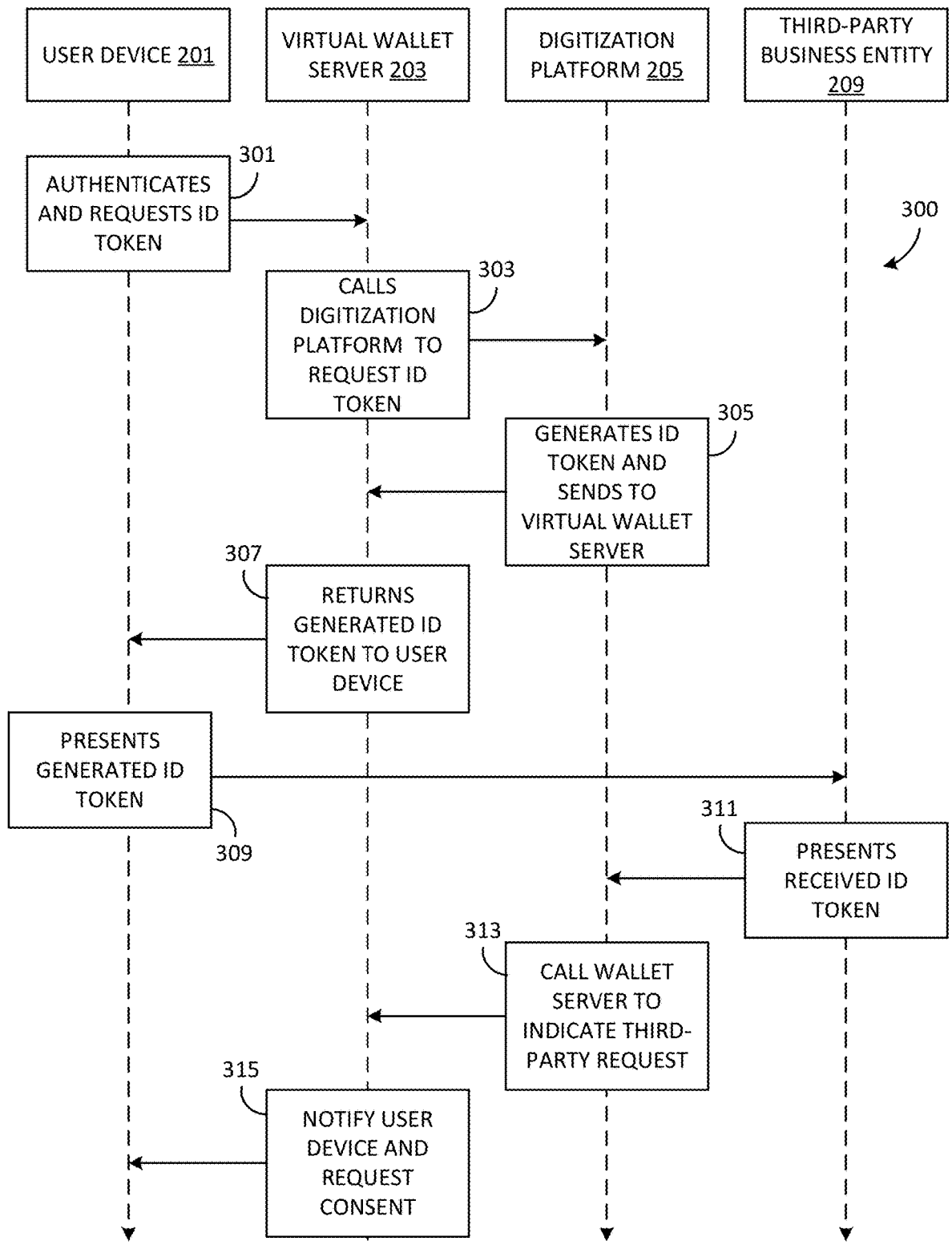
FIGS. 3A-3B are an example computerized method of sharing data between a user and a third-party entity using an ID token.
Figure 3B:
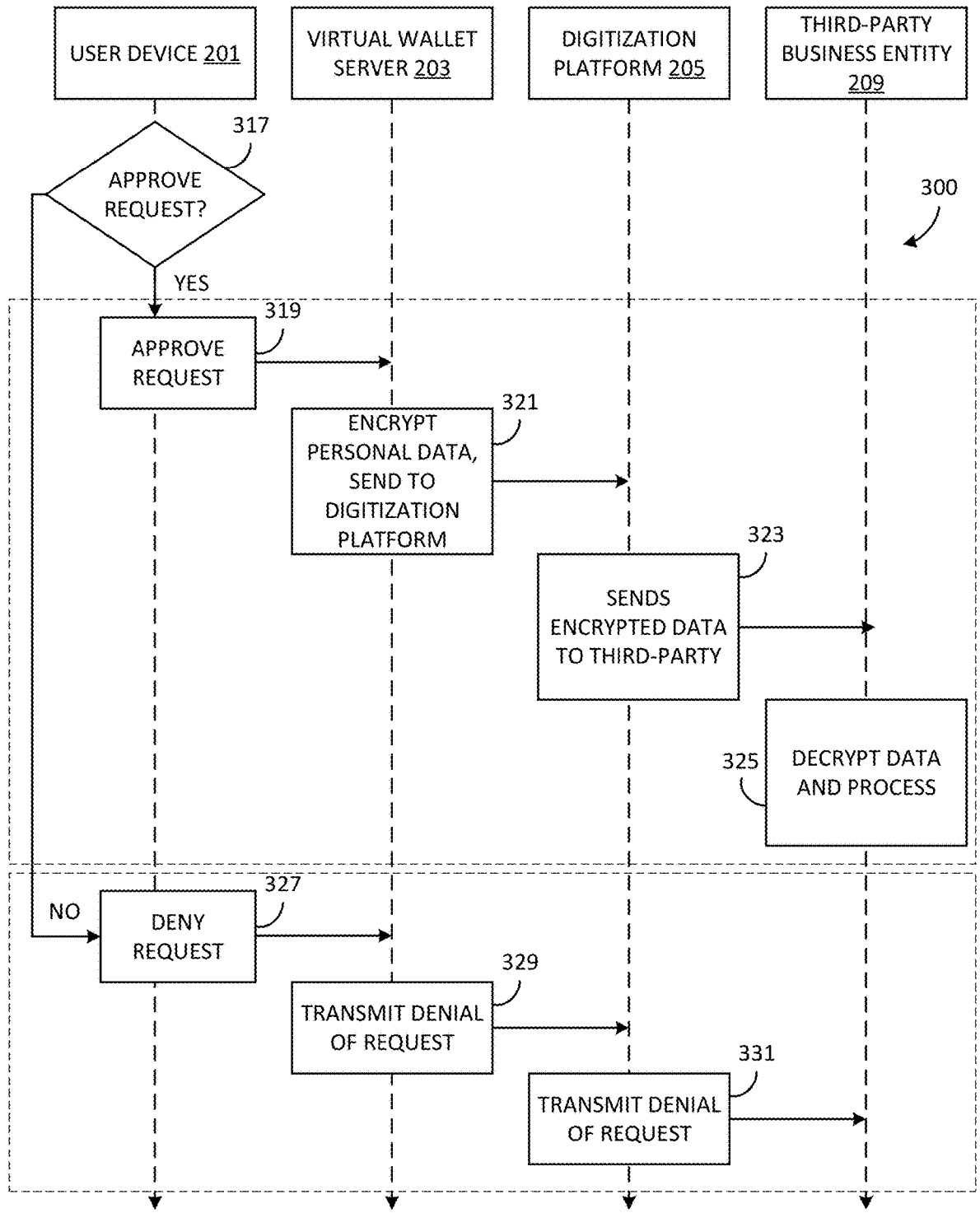

FIGS. 3A-3B are a computerized method of sharing data between a user and a third-party entity using an ID token according to implementations of the present disclosure. The computerized method of FIGS. 3A-3B is for illustration only and should not be construed as limiting. Various examples of the computerized method 300 can be used without departing from the scope of the present disclosure. In some examples, the method 300 is implemented by the computing device 102 and/or the digitization platform 205. It should be understood that FIG. 3B is a continuation of the computerized method 300 introduced in FIG. 3A and FIGS. 3A and 3B collectively present the computerized method 300. The computerized method 300 generates the ID token 207 and enables a user to control how the user data 120 is shared and manage the lifecycle of their personal data.

The computerized method 300 begins by the user device 201 being authenticated to the virtual wallet server 203 and requesting an ID token, such as the ID token 207, in operation 301. In some implementations, the user device 201 is authenticated in the setup of the user device 201 and/or when the user device 201 first sets up, installs, opts in, or otherwise first implements the consumer wallet. For example, the user device 201 authenticates upon download and install of the client-side of the virtual wallet managed by the virtual wallet server 203. In other implementations, the user device 201 is authenticated at a point in time after the setup of the user device 201 with the virtual wallet server 203. In some implementations, the user device 201 authenticates upon the user logging into the consumer wallet of the user device 201.

In operation 303, the virtual wallet server 203 calls the digitization platform 205 to request an ID token for an account corresponding to the user of the user device 201. The request (e.g., a first request) includes a consumer identification number that signals to the digitization platform 205 the particular user requesting the ID token.

In operation 305, the digitization platform 205 generates the ID token for the account corresponding to the user of the user device 201. The digitization platform 205 determines the user is not already assigned a current ID token, for example by cross-referencing one or more elements of provided user data of the user to confirm an existing ID token is not assigned to the user. In response to confirming an existing ID token is not assigned to the user, the digitization platform 205 generates the ID token by generating an alphanumeric sequence and associating one or more elements of the user with the generated ID token. For example, the digitization platform 205 associates a consumer ID with the generated ID token as a reference to identify the particular generated ID token. In some implementations, the generated ID token is stored in the digitization platform 205, for example in one or both of the memory 104 and the data storage device 116. Following the generation of the ID token, the digitization platform 205 sends, or transmits, the generated ID token to the virtual wallet server 203.

In some implementations, the alphanumeric sequence is a random sequence of numbers and letters. As referenced herein, a random sequence is a sequence that is not generated in any particular order relative to the previously generated sequence or the next sequence to be generated. For example, a first generated ID token may have a sequence of A1B2C3D4, while the next generated ID token may have a sequence of 1H7YUI4R. In other implementations, the alphanumeric sequence is one of multiple sequences generated sequentially. For example, a first generated ID token may have a sequence of A1B2C3D4, while the next generated ID token may have a sequence of A1B2C3D5.

In operation 307, the virtual wallet server 203 returns the generated ID token, received from the digitization platform 205, to the user device 201 of the user corresponding to the consumer ID associated with the generated ID token. For example, the virtual wallet server 203 stores the generated ID token in a storage location and transmit one or more of a push notification, a text message, an email, or a phone call to the user device 201 indicating the ID token has been generated and is ready for use. The user can view, present, manage, and so forth the generated ID token and data associated with the generated ID token from the client-side of the consumer wallet application on the user device 201.

In operation 309, the user device 201 presents the generated ID token to the third-party business entity 209. In some implementations, the user device 201 physically presents the generated ID token to the third-party business entity 209, for example by enabling a device associated with the third-party business entity 209 to scan a barcode or a QR code presented on the user device 201. In another example, the user device 201 presents a code, such as a sequence of numbers, letters, or both, that is input into an electronic device of the third-party business entity 209. In some implementations, user device 201 presents the generated ID token to the third-party business entity 209 virtually. For example, the user device 201 can present the generated ID token to the third-party business entity 209 electronically for the processing of an electronic transaction. In various other implementations, the user device 201 can provide the generated ID token to the third-party business entity 209 via an app-to-app checkout process, verbally or electronically over the phone, or key the generated ID token into an electronic device of the third-party business entity 209 manually.

In operation 311, the third-party business entity 209 presents the ID token received from the user device 201 to the digitization platform 205 to request user data of the user that is associated with the particular ID token. In some implementations, the third-party business entity 209 additionally presents a public certification to the digitization platform 205. The public certification serves to validate or increase the probability of validation from the digitization platform 205, the third-party business entity 209. In some implementations, the public certification is a digital signature.

Upon receipt of the request (e.g., a second request) from the third-party business entity 209 for the user data of the user associated with the particular ID token, the digitization platform 205 determines a trustworthiness score for the request. The trustworthiness score takes into account one or more of the particular third-party business entity 209, particular user device 201, the particular request, the user data requested in view of the type of entity the third-party business entity 209 is, and the user data requested in view of the type of data processing requested by the user device 201 when presenting the generated ID token. In some implementations, the trustworthiness of the third-party business entity 209 is determined based at least in part on an analysis of the entity data 118 corresponding to the particular third-party business entity 209. For example, the entity data 118 can include past transaction history, information regarding past data breaches with the third-party business entity 209, and so forth.

Based on the results of the determined trustworthiness score, the digitization platform 205 adds a tag, or flag, to the received request. In some implementations, the trustworthiness score is compared to a trustworthiness threshold to determine whether the trustworthiness score indicates a trustworthy or fraudulent request. In some implementations, the tag is binary and either tags the received request as trustworthy or potentially fraudulent. In some implementations, the tag is a score on a spectrum that ranges from trustworthy to fraudulent. For example, the trustworthiness score can include certainly fraudulent, likely fraudulent, no determination available, likely trustworthy, and trustworthy.

For example, where the entity data 118 indicates the third-party business entity 209 is an e-commerce platform, the particular user device 201 is frequently involved in transaction with e-commerce accounts, and the user data 120 requested from the third-party business entity 209 includes the first name, last name, home address, and credit card number, the digitization platform 205 attaches a trustworthiness score of likely trustworthy to the request. If additional information is present that the user device 201 is frequently involved in transactions associated with the particular e-commerce platform requesting the user data 120 and the transaction amount is within the normal range for transactions between the user device 201 and the particular e-commerce platform, the digitization platform 205 may attach a trustworthiness score of trustworthy to the request. However, if additional information is present that the user device 201 has never been involved in transactions associated with an e-commerce platform selling this particular type of goods and services and the transaction amount is above a normal range for transactions for the user device 201, the digitization platform 205 may attach a trustworthiness score of likely fraudulent to the request.

In some implementations, the tag further includes a recommendation as to whether the user device 201 should accept or deny the received request. For example, a trustworthy score corresponds to a recommendation to accept the received request and a fraudulent score corresponds to a recommendation to deny the received request.

In some implementations, the digitization platform 205 includes a machine learning component to continually improve the assessment of received requests to improve the tag/flag of requests. For example, the machine learning component can be implemented on the fraud prevention module 124 to determine the trustworthiness of a request received from the third-party business entity 209 based on one or more of the entity data 118, user data 120, and wallet data. As the entity data 118 is continually updated, the machine learning component learns the patterns between particular requests of a particular entity or type of entity and a particular user or type of user.

In some implementations, the machine learning component operates as a feedback loop that improves the process that determines the trustworthiness score for a particular request. For example, where a request is received from a third-party business entity 209 that is a foreign e-commerce platform that has not previously completed a transaction with the user associated with the ID token 207, the digitization platform 205 may flag the request as likely fraudulent. However, upon the user device 201 later accepting the request and the digitization platform 205 receiving feedback that the request was related to an authorized transaction by the user device 201, the digitization platform 205 increments future similar requests to tend toward more trustworthy. For example, a future request that otherwise would have been tagged as likely fraudulent is tagged as no determination available, a future request that otherwise would have been tagged as no determination available is tagged as likely trustworthy, and so forth.

In operation 313, the digitization platform 205 calls the virtual wallet server 203 to indicate the received request from the third-party business entity 209. In some implementations, the digitization platform 205 transmits an indication of the trustworthiness score and the received request to the virtual wallet server 203. For example, the indication can include the recommendation to accept or deny the received request along with the request, rather than a value corresponding to the trustworthiness score. For example, the digitization platform 205 can transmit the tag of the received request instead or, or in addition to, a value corresponding to the trustworthiness score.

In operation 315, the virtual wallet server 203 notifies the user device 201 of the request received from the digitization platform 205 and requests consent of the release of the user data of the user to the third-party business entity 209. In some implementations, the notification includes the received request and any tags or recommendations received from the digitization platform 205. The virtual wallet server 203 can notify the user device 201 via a push notification, a text message, an email message, a phone call, and so forth.

In operation 317, the user of the user device 201 determines whether to approve or deny the received request from the third-party business entity 209. In some implementations, the user device 201 determines to approve or deny the received request automatically based on the recommendation received from the digitization platform 205. In other implementations, the user of the user device 201 manually determines to approve or deny the received request. In implementations where the user of the user device 201 determines to approve the request, the computerized method proceeds to operation 319. In implementations where the user of the user device 201 determines to deny the request, the computerized method proceeds to operation 327.

In operation 319, the user device 201 approves the request for user data associated with the ID token. In some implementations, approving the request includes responding to the notification received in operation 315. For example, the notification includes a prompt requesting the user of the user device 201 to accept or deny the received request. In some implementations, the approval includes an approval of all the personal data received in the request. In other implementations, the approval includes a selection of a limited amount of personal data received in the request. In other words, the approval can include an approval of less personal data than was requested.

For example, the received request is a request from an e-commerce site to process a transaction that includes a request for user data 120 including the user's first name, last name, date of birth, credit card number, and social security number. In some implementations, the approval is an approval for the virtual wallet server 203 to send all the requested user data 120. In other implementations, the approval is an approval for the virtual wallet server 203 to send only the user data 120 of the user's first name, last name, date of birth, and credit card number, but does not approve the disclosure of the social security number.

In operation 321, the virtual wallet server 203 receives the approval from the user device 201, encrypts the approved user data 120 using a shared key of the third-party, and transmits the encrypted user data 120 to the digitization platform 205. The encryption using the shared key enables only the third-party to decrypt the user data 120. The shared key is predetermined and specific to the third-party business entity 209 so only the third-party business entity 209 requesting the user data 120 is able to decrypt the user data 120. Some examples use a public key infrastructure (PKI)

wherein the shared key is a public key of the third-party and the decryption key is a private key known only to the third-party.

Accordingly, the communications between the user device 201, the virtual wallet server 203, the digitization platform 205, and the third-party business entity or entities 209 include three layers of authentication. The first layer is the initial authentication of the user device 201 with reference to the virtual wallet server 203, the virtual wallet server 203 to the digitization platform 205, and the third-party business entity 209 to the digitization platform 205. The second layer includes the digital signature included in the particular messages sent among the elements of the system 200. In other words, each message is digitally signed to provide authentication of each party sending a particular message. The third layer includes the PKI. Because the virtual wallet server 203 and the third-party business entity 209 are the only entities that control and/or access the private key, the virtual wallet server 203 and the third-party business entity 209 are the only entities able to encrypt and decrypt the transmitted user data 120.

In operation 323, the digitization platform 205 sends the encrypted user data 120 to the third-party business entity 209. In operation 325, the third-party business entity 209 decrypts the user data 120 and processes the data according to the business needs of the particular entity. In the example above where the received request is a request to process a transaction, the third-party business entity 209 processes the transaction requested by the user device 201.

In operation 327, the user device 201 denies the received request. In the example above, the received request is a request from an e-commerce site to process a transaction that includes a request for user data 120 including the user's first name, last name, date of birth, credit card number, and social security number. In some implementations, to deny the request, the user device 201 denies the disclosure of any of the requested user data 120. In other implementations, to deny the request, the user device 201 denies the disclosure of user data 120 deemed to be required to process the transaction. For example, the credit card number is required to process the transaction because without the credit card number, the transaction cannot be charged to a particular card or account. Accordingly, a denial of the credit card number is a denial of the request.

In operation 329, the virtual wallet server 203 transmits the denial of the request to the digitization platform 205. The transmission of the denial does not include the user data 120, including encrypted versions of the user data 120. In operation 331, the digitization platform 205 transmits the denial to the third-party business entity 209 and the purpose of the request, such as processing the transaction, is not completed.

Figure 4:
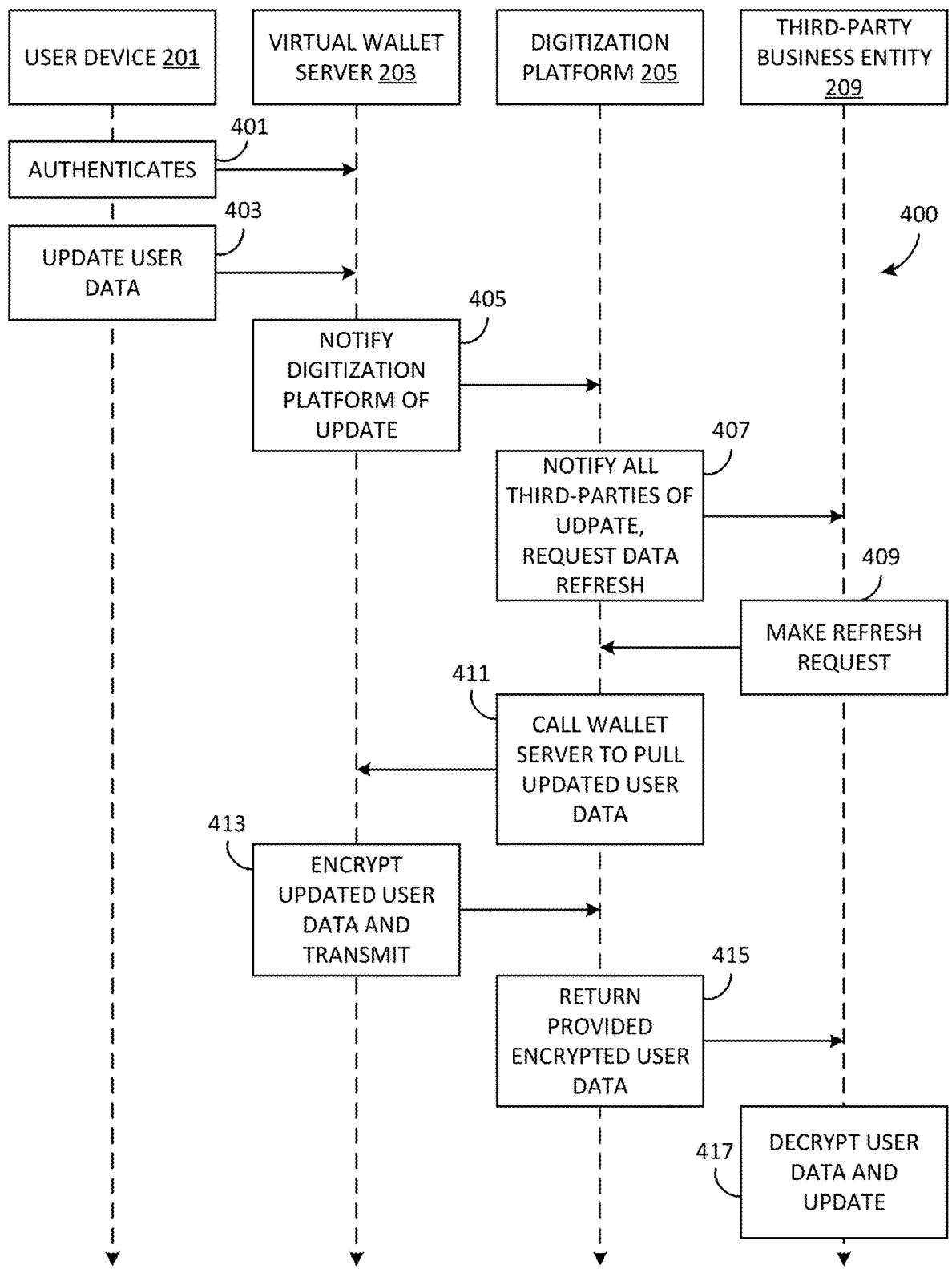
FIG. 4 is an example computerized method of refreshing personal data using an ID token.

FIG. 4 is a computerized method of refreshing personal data using an ID token according to implementations of the present disclosure. The computerized method of FIG. 4 is for illustration only and should not be construed as limiting. Various examples of the computerized method 400 can be used without departing from the scope of the present disclosure. In some examples, the method 400 is implemented by the computing device 102 and/or the digitization platform 205. The computerized method 400 enables a user to update the user data 120 via the ID token 207.

The computerized method 400 begins by the user device 201 being authenticated to the virtual wallet server 203 and requesting an ID token, such as the ID token 207, in operation 401. For example, as described above with reference to FIG. 3, the user device 201 is authenticated in the setup of the user device 201 and/or when the user device 201 first sets up, installs, opts in, or otherwise first implements the consumer wallet, upon download and install of the client-side of the virtual wallet managed by the virtual wallet server 203, or at any point in time after the setup of the user device 201 with the virtual wallet server 203. In some implementations, the user device 201 authenticates upon the user logging into the consumer wallet of the user device 201.

In operation 403, the user updates the user data 120 via the user device 201. For example, the user data 120 is updated via the consumer wallet accessed via the user device 201. Updating the user data 120 includes changing one or more elements of the user data 120, such as one or more of adding, deleting, or replacing one or more elements of the user data 120 such as the first name, last name, gender, date of birth, current address, previous addresses, mobile number or numbers, telephone number or numbers, drivers license information, passport information, bank account information, credit card numbers, electronic mail (e-mail) address or addresses, or social security numbers. For example, in a scenario where the user has moved and acquired a new credit card, the updated user data 120 includes a newly added credit card number, a deleted current address, and a newly added current address to indicate the new credit card and updated address. In some implementations, rather than deleting a current address and adding a new current address, the address element is changed to reflect the new address. The updated user data 120 is updated on the virtual wallet server 203 via the user device 201.

In some implementations, the updated user data 120 includes a specification of particular third-party business entities 209 to which the updated user data 120 is to be sent. In other implementations, the updated user data 120 is updated for each third-party business entity 209 that is currently authorized to access the user data 120 associated with the ID token 207.

In operation 405, the virtual wallet server 203 notifies the digitization platform 205 of the updated user data 120. For example, the virtual wallet server 203 transmits a signal to the digitization platform 205 including the ID token 207 corresponding to the user data 120 which has been updated. In some implementations, the transmission includes a tag, or a flag, alert, etc., to indicate the particular ID token 207 associated with the updated user data 120.

In operation 407, the digitization platform 205 notifies all third-parties associated with the ID token 207 of the updated user data 120 and requests each third-party refreshes their data. As described herein, the generated ID token 207 can be used by multiple third-party business entities 209 to extract user data 120, which the individual third-party business entities 209 then store separately. For example, where the ID token 207 has been used to authorize access of the user data 120 to an e-commerce platform and an insurance company, the digitization platform 205 identifies the e-commerce platform and the insurance company as having been previously authorized to access the user data 120 associated with the ID token 207 and transmits a signal to both the e-commerce platform and the insurance company of the update to the user data 120 associated with the ID token 207.

In operation 409, the third-party business entity 209 requests a data refresh of the user data 120 associated with the ID token 207. In some implementations, the request is a confirmation in response to the notification received in operation 407. In some implementations, the data refresh request of operation 409 is executed separately by each third-party business entity 209 that receives the notification of the updated user data 120. In some implementations, the request includes a digital signature that authenticates the request and the third-party business entity 209.

In operation 411, the digitization platform 205 receives the data refresh request from each third-party business entity 209 and calls the virtual wallet server 203 to pull the updated user data 120 for each third-party business entity 209 that requested refreshed user data 120. In some implementations, the digitization platform 205 transmits a single signal to the virtual wallet server 203 regarding all of the third-party business entities 209 which requested the refreshed user data 120. For example, the digitization platform 205 waits a predetermined amount of time after sending the notification in operation 407 to receive data refresh requests. In other implementations, the digitization platform 205 transmits separate signals to the virtual wallet server 203 corresponding to each separate data refresh request.

In operation 413, the virtual wallet server 203 receives the signal, or signals, from the digitization platform 205 to send the updated user data 120, encrypts the updated user data, and transmits the encrypted user data 120. As described herein, the updated user data 120 is encrypted using the PKI. In some implementations, the private key is specific to the third-party business entity 209 so only the third-party business entity 209 requesting the user data 120 is able to decrypt the user data 120. For example, the updated user data 120 can be encrypted with a separate private key for each third-party business entity 209.

In some implementations, the updated user data 120 that is encrypted and transmitted is dependent upon the user data 120 that has been previously authorized for each particular third-party business entity 209. In the example above where the third-party business entities 209 that requested updated user data 120 were the e-commerce platform and the insurance company, the e-commerce platform may have authorization for both the updated address and the new credit card number, whereas the insurance company may have authorization for only the updated address. Accordingly, the encrypted user data 120 transmitted to the e-commerce platform includes the updated address and new credit card number and the encrypted user data 120 transmitted to the insurance company includes only the updated address.

In some implementations, only the updated user data 120 is encrypted and transmitted. In other words, user data 120 that was not affected in the update performed in operation 403 is not encrypted and transmitted. In other implementations, all of the user data 120 authorized for a particular third-party business entity 209 is encrypted and transmitted.

In operation 415, the digitization platform 205 sends the encrypted user data 120 to each respective third-party business entity 209. For example, the digitization platform 205 transmits the encrypted address, encrypted credit card number, and private key to the e-commerce platform and the encrypted address and private key to the insurance company.

In operation 417, each third-party business entity 209 decrypts the received user data 120 and updates the stored user data 120 for the particular consumer ID associated with the ID token 207. Accordingly, the user is able to update their user data 120 stored by multiple third-party business entities 209 by making only a single change via the consumer wallet accessed via the user device 201.

Figure 5:
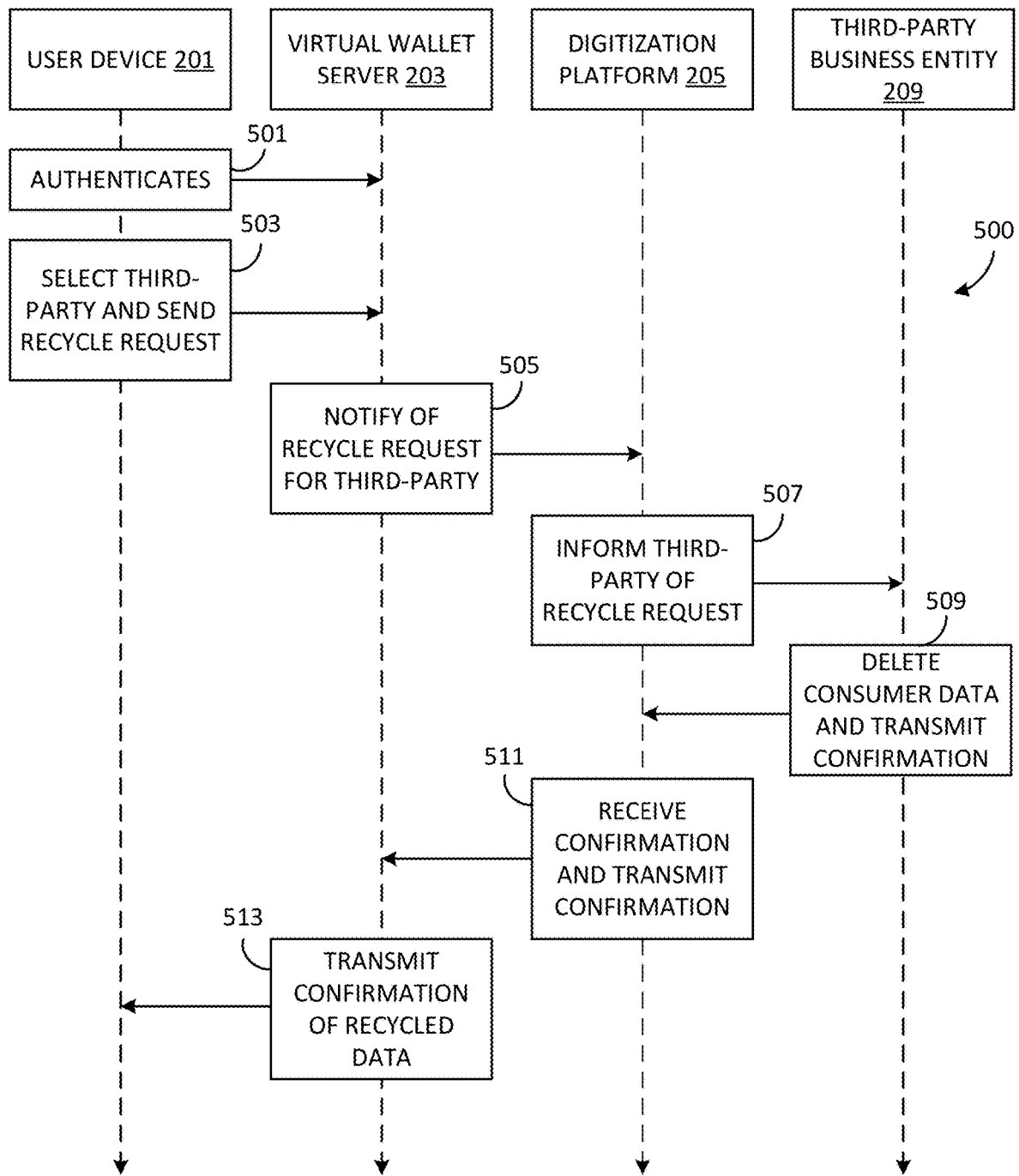
FIG. 5 is an example computerized method of recycling personal data using an ID token.

FIG. 5 is a computerized method of recycling personal data using an ID token according to implementations of the present disclosure. The computerized method of FIG. 5 is for illustration only and should not be construed as limiting. Various examples of the computerized method 500 can be used without departing from the scope of the present disclosure. In some examples, the method 500 is implemented by the computing device 102 and/or the digitization platform 205. The computerized method 500 enables a user to recycle the user data 120 from one or more third-party databases via the ID token 207.

The computerized method 500 begins by the user device 201 being authenticated to the virtual wallet server 203 and requesting an ID token, such as the ID token 207, in operation 501. For example, as described above with reference to FIGS. 3 and 4, the user device 201 is authenticated in the setup of the user device 201 and/or when the user device 201 first sets up, installs, opts in, or otherwise first implements the consumer wallet, upon download and install of the client-side of the virtual wallet managed by the virtual wallet server 203, or at any point in time after the setup of the user device 201 with the virtual wallet server 203. In some implementations, the user device 201 authenticates upon the user logging into the consumer wallet of the user device 201.

In operation 503, the user, via the user device 201, selects one or more third-party business entities 209 to recycle the stored user data 120 corresponding to the ID token 207. As described herein, the user data 120 is stored by one or more third-party business entities 209 that are authorized to access the user data 120 corresponding to the ID token 207. In some implementations, the user may determine to revoke authorization to the user data 120 and for the third-party business entity 209 to no longer store the user data 120, including any records of the user and the user data 120. Thus, the user device 201 sends a request to recycle, or delete, the stored user data 120. In other implementations, the recycle request includes only some of the user data 120 stored by a particular third-party business entity 209.

In some implementations, the selection to recycle stored user data 120 occurs automatically based on the expiration of a predetermined time frame elapsing between communication between the user device 201 and/or the virtual wallet server 203 and a third-party business entity 209. For example, the sharing of the user data 120 may have a time to live (TTL) value, such as six months, one year, and so forth, and upon the expiration of the TTL value the user device 201 and/or the virtual wallet server 203 automatically transmits the selection for the third-party business entity 209 to recycle the stored user data 120. In other implementations, the selection to recycle stored user data 120 occurs based on an affirmative request by the user device 201 to the third-party business entity 209 to recycle the stored user data 120.

In operation 505, the virtual wallet server 203 notifies the digitization platform 205 of the recycle request (e.g., a third request) for the third-party business entity 209. In some implementations, the notification of the recycle request includes the ID token 207 and a third-party business entity 209 ID to identify the particular third-party business entity 209 associated with the recycle request.

In operation 507, the digitization platform 205 informs the third-party business entity 209 of the recycle request. In some implementations, informing the third-party business entity 209 of the recycle request includes a request for confirmation that the third-party business entity 209 has recycled the user data 120.

In operation 509, the third-party business entity 209 deletes the stored user data 120 included in the recycle request. As described herein, in some implementations the recycle request includes all of the user data 120 associated with a particular consumer ID for the ID token 207. In other implementations, the recycle request includes only some of the user data 120 associated with a particular consumer ID for the ID token 207. Following the deletion of the stored user data 120, the third-party business entity 209 transmits a confirmation of the recycled user data 120 to the digitization platform 205. In some implementations, the confirmation includes a digital signature that authenticates the confirmation and the third-party business entity 209.

In operation 511, the digitization platform receives the confirmation from the third-party business entity 209 and transmits the confirmation to the virtual wallet server 203. In operation 513, the virtual wallet server 203 transmits the confirmation to the user device 201, for example as a push notification, a text message, an email, a phone call, and so forth.

Figure 6:
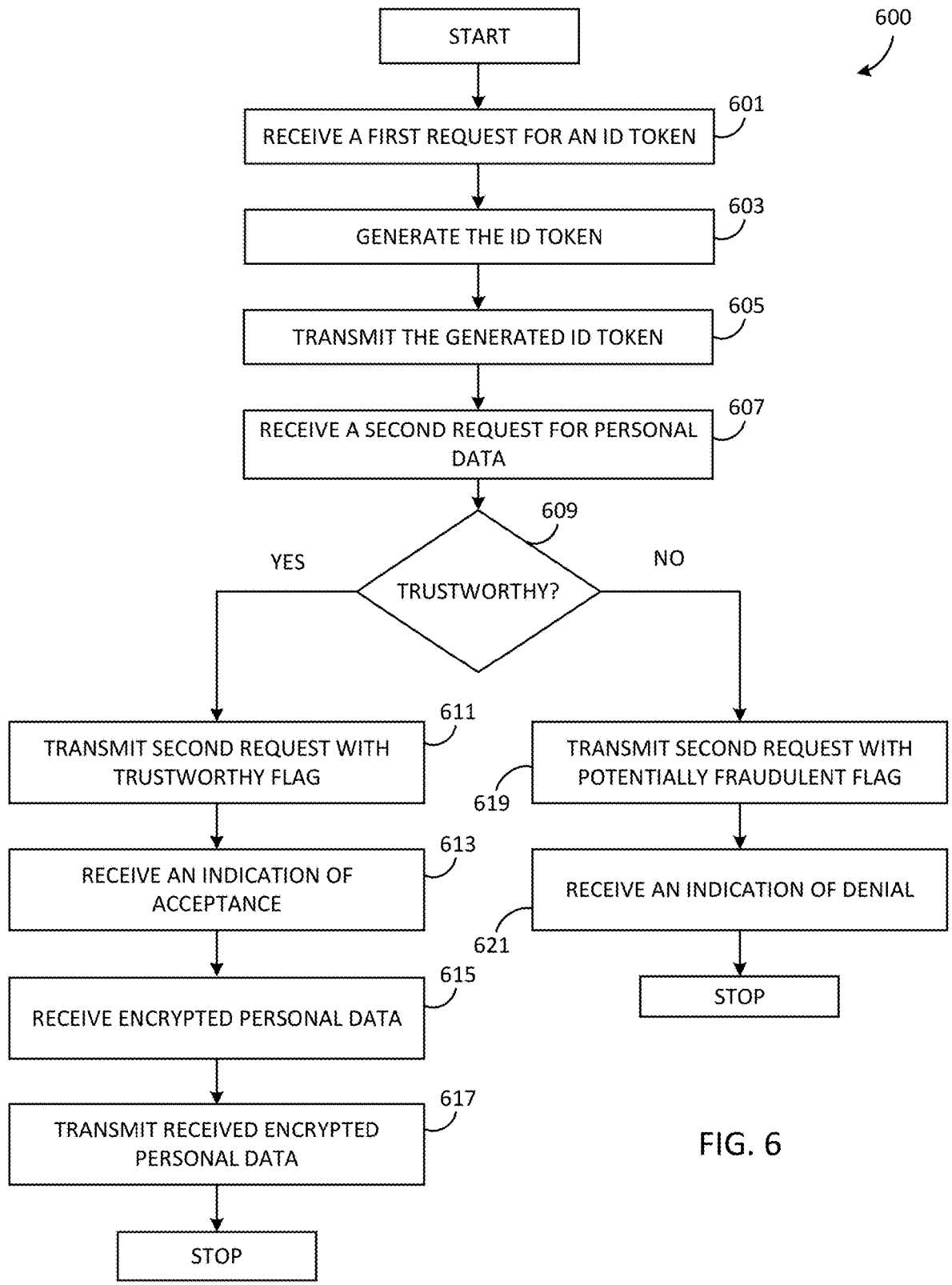
FIG. 6 is an example computerized method of managing an ID token.

FIG. 6 is a computerized method of managing an ID token according to implementations of the present disclosure. The computerized method of FIG. 5 is for illustration only and should not be construed as limiting. Various examples of the computerized method 500 can be used without departing from the scope of the present disclosure. In some examples, the method 500 is implemented by the computing device 102 and/or the digitization platform 205.

The computerized method 600 begins by the digitization platform 205 receiving a first request for an ID token, such as the ID token 207, from a virtual wallet in operation 601. The ID token corresponds to a particular user. For example, the ID token 207 can include a consumer ID associated with the particular user or the ID token 207 can itself be associated with the particular user. In some implementations, the virtual wallet is the virtual wallet server 203, which is presented to a user as the consumer wallet on the user device 201.

In operation 603, the digitization platform 205 generates the ID token in response to the first request received from the virtual wallet. To generate the ID token, the digitization platform 205 determines, or confirms, the user associated with the request is not assigned a current ID token. For example, determining the user is not assigned a current ID token includes cross-referencing the consumer ID with a list of current ID tokens and identifying the consumer ID is not presently associated with a current ID token. In examples where the digitization platform 205 determines the consumer ID is currently or already assigned an ID token, the digitization platform 205 transmits a response to the virtual wallet indicating the consumer ID is already assigned an ID token and, in some implementations, includes a copy of the ID token assigned to the consumer ID. In examples where the digitization platform 205 determines the consumer ID not currently assigned an ID token, the digitization platform 205 generates the ID token by generating an alphanumeric sequence and associating one or more elements of the user with the generated ID token, such as the consumer ID, as described herein.

In operation 605, the digitization platform 205 transmits the generated ID token to the virtual wallet. Once the ID token has been received, the ID token can be presented to a third-party entity, such as the third-party business entity 209. In some implementations, the ID token is presented to the third-party business entity 209 by the user device 201 as described herein.

In operation 607, the digitization platform 205 receives a second request for the personal data, i.e., the user data 120, corresponding to the ID token 207 from the third-party entity following the user device 201 presenting the ID token. In some implementations, receiving the second request includes receiving a digital signature associated with the request that authenticates the request and third-party entity.

In operation 609, in response to receiving the request for the personal data, the digitization platform 205 determines whether the third-party entity is trustworthy to receive the personal data corresponding to the ID token 207. For example, the digitization platform 205 determines a trustworthiness score corresponding to the third-party entity based at least in part on an analysis of entity data, such as the entity data 118, corresponding to the third-party entity. As described herein, the digitization platform 205 analyzes the entity data 118 associated with the third-party business entity 209, the user device 201, the particular request, the user data requested in view of the type of entity the third-party business entity 209 is, and the user data requested in view of the type of data processing requested by the user device 201 to determine a trustworthiness score for the third-party business entity 209 and the request for the personal data. In implementations where the digitization platform 205 determines a trustworthiness score indicating the request is trustworthy, the computerized method 600 proceeds to operation 611. In implementations where the digitization platform 205 determines a trustworthiness score indicating the request is not trustworthy, the computerized method 600 proceeds to operation 619.

In operation 611, the digitization platform 205 transmits an indication of the received second request from the third-party entity and the trustworthiness score to the virtual wallet. In some implementations, the transmission includes a recommendation to accept the received request based on the trustworthiness score indicating the request is trustworthy. The virtual wallet transmits the indication of the trustworthiness score and the received second request, and optionally the recommendation from the digitization platform 205, to the user device 201 of the user associated with the ID token 207. The digitization platform 205 receives a response from the virtual wallet regarding an acceptance or denial of the request. For example, in operation 613, the digitization platform 205 receives an indication of acceptance of the second request from the virtual wallet. In some implementations, receiving the acceptance includes receiving an indication of a portion of the personal data associated with the generated ID token 207 to be transmitted to the third-party entity that is less than the total amount of personal data requested by the third-party entity. In other words, the user device 201 may choose to approve, or accept, a portion of the personal data that is less than what was requested by the third-party entity. In examples where the digitization platform 205 receives a denial of the request, for example as in operation 621 described below, the computerized method 600 terminates.

In operation 615, the digitization platform 205 receives encrypted personal data, i.e., the user data 120, associated with the generated ID token from the virtual wallet. It should be understood that although described herein as being performed in separate steps, operations 613 and 615 can be performed simultaneously. For example, the indication of acceptance and the encrypted user data 120 can be received as a single message.

In operation 617, the digitization platform 205 transmits the encrypted personal data to the third-party entity for processing. For example, the processing can include executing a transaction, updating insurance information, updating government stored information such as drivers license information, or any other type of processing suitable for processing using the ID token 207.

In operation 619, following the digitization platform 205 determining the received request is not trustworthy in operation 609, the digitization platform 205 transmits the received request from the third-party entity and the trustworthiness score to the virtual wallet. In some implementations, the transmission includes a recommendation to deny the received request based on the trustworthiness score indicating the request is not trustworthy. The virtual wallet transmits the trustworthiness score and the received request, and optionally the recommendation from the digitization platform 205, to the user device 201 of the user associated with the ID token 207. The digitization platform 205 receives a response from the virtual wallet regarding an acceptance or denial of the request.

For example, in operation 621, the digitization platform 205 receives an indication of denial of the request from the virtual wallet. In response to the receipt of denial of the request, the digitization platform 205 transmits a denial of the request to the third-party entity and the computerized method 600 terminates.

In some implementations the user of the user device 201 may choose to accept the request from the third-party entity although the recommendation from the digitization platform 205 is to deny. In these implementations, the digitization platform 205 receives an indication of acceptance as in operation 613 and proceeds through operations 613, 615, and 617 as described above.

In some implementations, the digitization platform 205 receives, from the virtual wallet, a refresh notification corresponding to the generated ID token 207 generated in operation 607. The refresh notification includes the updated personal data associated with the generated ID token 207. In response to receiving the refresh notification, the digitization platform 205 transmits an update notification to the third-party entity. The third-party entity updates the user data 120 and sends a confirmation of the updated personal information that the personal data associated with the generated ID token 207 has been updated.

In some implementations, the digitization platform 205 receives, from the virtual wallet, a recycle notification corresponding to the generated ID token 207. The recycle notification includes a request for the third-party entity to delete the personal data associated with the generated ID token 207. In response to receiving the recycle notification, the digitization platform 205 transmits a delete order to the third-party entity. The third-party entity deletes the user data 120 associated with the recycle request and sends a deletion confirmation that the personal information associated with the generated ID token 207 has been deleted.

EXAMPLE OPERATING ENVIRONMENT

Figure 7:
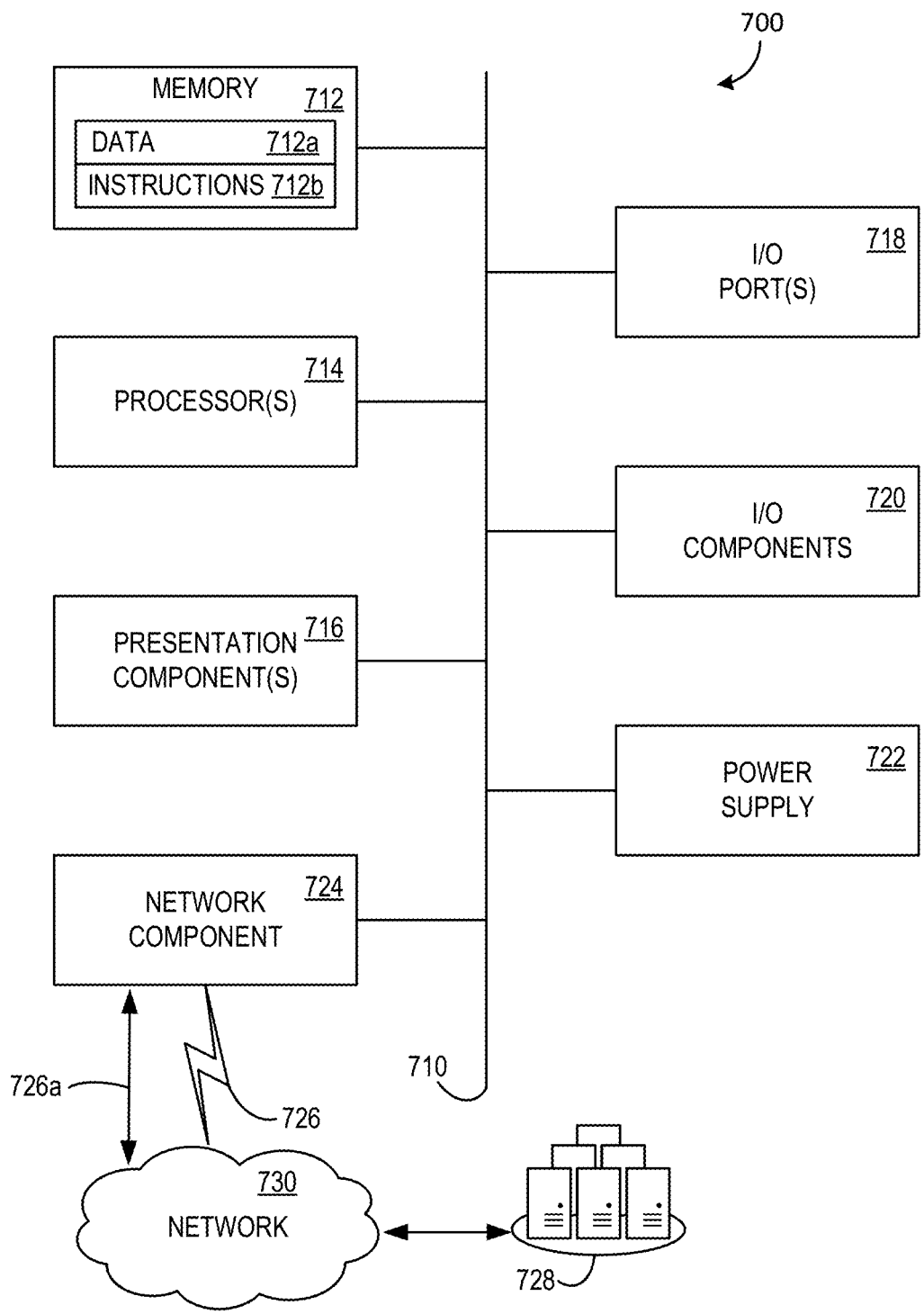
FIG. 7 is a block diagram of an example computing device for implementing implementations of the present disclosure.

FIG. 7 is a block diagram of an example computing device 700 for implementing aspects disclosed herein and is designated generally as computing device 700. Computing device 700 is an example of a suitable computing environment and is not intended to suggest any limitation as to the scope of use or functionality of the examples disclosed herein. Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

In some examples, the computing device 700 is the computing device 102. Accordingly, the memory 702, the processor 708, the presentation component(s) 716, and the network 730 can be the memory 104, the processor 108, the user interface 110, and the network 126, respectively. However, these examples should not be construed as limiting. Various examples are possible.

Computing device 700 includes a bus 710 that directly or indirectly couples the following devices: computer-storage memory 712, one or more processors 708, one or more presentation components 716, I/O ports 718, I/O components 720, a power supply 722, and a network component 724. While computing device 700 is depicted as a seemingly single device, multiple computing devices 700 may work together and share the depicted device resources. For example, memory 702 may be distributed across multiple devices, and processor(s) 708 may be housed with different devices.

Bus 710 represents what may be one or more busses (such as an address bus, data bus, or a combination thereof). Although the various blocks of FIG. 7 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 702 may take the form of the computer-storage media references below and operatively provide storage of computer-readable instructions, data structures, program modules and other data for computing device 700. In some examples, memory 702 stores one or more of an operating system, a universal application platform, or other program modules and program data. Memory 712 is thus able to store and access data 712*a* and instructions 712*b* that are executable by processor 708 and configured to carry out the various operations disclosed herein.

In some examples, memory 712 includes computer-storage media in the form of volatile and/or nonvolatile memory, removable or non-removable memory, data disks in virtual environments, or a combination thereof. Memory 712 may include any quantity of memory associated with or accessible by computing device 700. Memory 712 may be internal to computing device 700, external to computing device 700, or both. Examples of memory 712 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 700. Additionally, or alternatively, memory 712 may be distributed across multiple computing devices 700, for example, in a virtualized environment in which instruction processing is carried out on multiple computing devices 700. For the purposes of this disclosure, "computer storage media," "computer-storage memory," "memory," and "memory devices" are synonymous terms for computer-storage memory 712, and none of these terms include carrier waves or propagating signaling.

Processor(s) 708 may include any quantity of processing units that read data from various entities, such as memory 712 or I/O components 720 and may include CPUs and/or GPUs. Specifically, processor(s) 708 are programmed to execute computer-executable instructions for implementing aspects of the disclosure. The instructions may be performed by the processor, by multiple processors within computing device 700, or by a processor external to client computing device 700. In some examples, processor(s) 708 are programmed to execute instructions such as those illustrated in the in the accompanying drawings. Moreover, in some examples, processor(s) 708 represent an implementation of analog techniques to perform the operations described herein. For example, the operations may be performed by an analog client computing device 700 and/or a digital client computing device 700. Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 720, some of which may be built in. Example I/O components 720 include, for example but without limitation, a microphone, joystick, game pad, satellite dish, scanner, printer, wireless device, etc.

Computing device 700 may operate in a networked environment via network component 724 using logical connections to one or more remote computers. In some examples, network component 724 includes a network interface card and/or computer-executable instructions (e.g., a driver) for operating the network interface card. Communication between computing device 700 and other devices may occur using any protocol or mechanism over any wired or wireless connection. In some examples, network component 724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are non-transitory and not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively, or in addition to the other examples described herein, examples include any combination of the following:
  receiving, from a virtual wallet, a first request for an identifier (ID) token corresponding to the user;
  generating the ID token;
  transmitting the generated ID token to the virtual wallet, wherein the generated ID token is presented to a third-party entity by a device of the user;
  receiving, from the third-party entity, a second request for personal data corresponding to the ID token;
  determining a trustworthiness score corresponding to the third-party entity based at least in part on an analysis of entity data corresponding to the third-party entity;
  transmitting an indication of the trustworthiness score and the second request to the virtual wallet, wherein the virtual wallet sends the indication of the trustworthiness score and the second request to the device of the user;
  receiving, from the virtual wallet, an indication of acceptance of the second request and encrypted personal data associated with the generated ID token;
  transmitting the encrypted personal data to the third-party entity for processing;
  determining the trustworthiness score further comprises flagging the second request as potentially fraudulent,
  transmitting the indication of the trustworthiness score and the second request includes transmitting a recommendation to the virtual wallet to deny the second request;
  determining the indication of the trustworthiness score further comprises flagging the second request as trustworthy;
  transmitting the indication of the trustworthiness score and the second request includes transmitting a recommendation to the virtual wallet to accept the second request;
  receiving, from the virtual wallet, a refresh notification corresponding to the generated ID token, the refresh notification including updated personal data associated with the generated ID token;
  transmitting an update notification to the third-party entity;
  receiving, from the third-party entity, a confirmation of the update notification,
  transmitting the updated personal data associated with the generated ID token to the third-party entity;
  receiving, from the virtual wallet, a recycle notification corresponding to the generated ID token, the recycle notification including a third request for the third-party entity to delete the personal data associated with the generated ID token;
  transmitting a delete order to the third-party entity;
  receiving a deletion confirmation of the personal data by the third-party entity,
  transmitting, to the virtual wallet, a deletion notification associated with the generated ID token;
  determining the user is not assigned a current ID token;
  generating the ID token;
  associating the personal data with the generated ID token;
  receiving, from the virtual wallet, an indication of a portion of the personal data associated with the generated ID token to be transmitted to the third-party entity; and
  receiving a digital signature associated with the second request, wherein the digital signature authenticates the second request and the third-party entity.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A method for managing personal data of a user, the method comprising:
receiving, by a digitization platform, from a virtual wallet a first request, the first request being a request for an identifier (ID) token corresponding to the user, the virtual wallet including a consumer wallet application running on a user device of the user;
responsive to the request, generating the ID token, by the digitization platform, the digitization platform having no visibility of personal data of the user;
transmitting the generated ID token, by the digitization platform, to the virtual wallet, wherein the generated ID token is presented to a third-party entity by the user device of the user;
receiving, by a digitization platform, from the third-party entity, a second request, the second request being a request for personal data corresponding to the ID token, the second request including a digital signature authenticating the request and the third-party entity;
determining, by the digitization platform, a trustworthiness score corresponding to the third-party entity based at least in part on an analysis of entity data corresponding to the third-party entity;
transmitting, by the digitization platform, an indication of the trustworthiness score and the second request to the virtual wallet; and
based on receiving from the virtual wallet an indication of acceptance of the second request and encrypted personal data associated with the generated ID token, transmitting by the digitization platform, the encrypted personal data to the third-party entity for processing a transaction.

2. The method of claim 1, wherein:
determining the trustworthiness score comprises flagging the second request as potentially fraudulent, and
transmitting the indication of the trustworthiness score and the second request includes transmitting a recommendation to the virtual wallet to deny the second request.

3. The method of claim 1, wherein:
determining the trustworthiness score comprises flagging the second request as trustworthy, and
transmitting the indication of the trustworthiness score and the second request includes transmitting a recommendation to the virtual wallet to accept the second request.

4. The method of claim 1, further comprising:
utilizing, by the digitization platform, a machine learning component to learn patterns in previous second requests of the third-party entity and corresponding indications of acceptance of the second request by the virtual wallet; and
using the learned patterns to improve a determination of the trustworthiness score corresponding to the third-party entity.

5. The method of claim 1, further comprising:
receiving, from the virtual wallet, a recycle notification corresponding to the generated ID token, the recycle notification including a third request for the third-party entity to delete the personal data associated with the generated ID token;
transmitting a delete order to the third-party entity;
receiving a deletion confirmation of the personal data by the third-party entity; and
transmitting, to the virtual wallet, a deletion notification associated with the generated ID token.

6. The method of claim 1, wherein generating the ID token comprises:
determining the user is not assigned a current ID token;
generating the ID token; and
associating the encrypted personal data with the generated ID token.

7. The method of claim 1, wherein receiving the indication of acceptance of the second request further comprises:
receiving, from the virtual wallet, an indication of a portion of the encrypted personal data associated with the generated ID token to be transmitted to the third-party entity.

8. A system for managing personal data of a user, the system comprising:
a plurality of processing units;
at least one communications interface; and
a plurality of memories storing instructions that, when executed by one or more processing units of the plurality of processing units, cause:
a first set of a plurality of processors to control a first communications interface of the at least one communications interface to receive, from a virtual wallet, a first request for an identifier (ID) token corresponding to the user, the virtual wallet including a consumer wallet application running on a device of the user;
the first set of the plurality of processors to generate the ID token;
the first set of the plurality of processors to control the first communications interface of the at least one communications interface to transmit the generated ID token to the virtual wallet;
a second set of the plurality of processors to control a second communications interface of the at least one communications interface to present the generated ID token to a third-party entity;
the first set of the plurality of processors to control the first communications interface of the at least one communications interface to receive, from the third-party entity, a second request for the personal data corresponding to the ID token;
the first set of the plurality of processors to determine a trustworthiness score corresponding to the third-party entity based at least in part on an analysis of entity data corresponding to the third-party entity;
the first set of the plurality of processors to control the first communications interface of the at least one communications interface to transmit an indication of the trustworthiness score and the second request to the virtual wallet;
the first set of the plurality of processors to control the first communications interface of the at least one communications interface to receive, from the virtual wallet, an indication of acceptance of the second request and encrypted personal data associated with the generated ID token; and
the first set of the plurality of processors to control the first communications interface of the at least one communications interface to transmit the encrypted personal data to the third-party entity for processing a transaction.

9. The system of claim 8, wherein the plurality of processing units is further configured to:
based on the trustworthiness score, flag the second request as potentially fraudulent; and control the first communications interface of the at least one communications interface to transmit a recommendation to the virtual wallet to deny the second request.

10. The system of claim 8, wherein the plurality of processing units is further configured to:
based on the trustworthiness score, flag the second request as trustworthy, and
control the first communications interface of the at least one communications interface to transmit a recommendation to the virtual wallet to accept the second request.

11. The system of claim 8, wherein the plurality of processing units is further configured to:
control the first communications interface of the at least one communications interface to receive, from the virtual wallet, a refresh notification corresponding to the generated ID token, the refresh notification including updated personal data associated with the generated ID token;
control the first communications interface of the at least one communications interface to transmit an update notification to the third-party entity;
receive, from the third-party entity, a confirmation of the update notification; and
control the first communications interface of the at least one communications interface to transmit the updated personal data associated with the generated ID token to the third-party entity.

12. The system of claim 8, wherein the plurality of processing units is further configured to:
control the first communications interface of the at least one communications interface to receive, from the virtual wallet, a recycle notification corresponding to the generated ID token, the recycle notification including a third request for the third-party entity to delete the personal data associated with the generated ID token;
control the first communications interface of the at least one communications interface to transmit a delete order to the third-party entity;
receive a deletion confirmation of the personal data from the third-party entity; and
control the first communications interface of the at least one communications interface to transmit, to the virtual wallet, a deletion notification associated with the generated ID token.

13. The system of claim 8, wherein the plurality of processing units is further configured to:
control the first communications interface of the at least one communications interface to utilize a machine learning component to learn patterns in previous second requests of the third-party entity and corresponding indications of acceptance of the second request by the virtual wallet; and
use the learned patterns to improve a determination of the trustworthiness score corresponding to the third-party entity.

14. The system of claim 8, wherein, to receive the indication of acceptance of the second request, the plurality of processing units is further configured to:
control the first communications interface of the at least one communications interface to receive, from the virtual wallet, an indication of a portion of the encrypted personal data associated with the generated ID token to be transmitted to the third-party entity.

15. A non-transitory computer readable medium storing instructions for managing personal data of a user that, when executed by a processor, cause the processor to:
receive, by a digitization platform, from a virtual wallet, a first request for an identifier (ID) token corresponding to the user, the virtual wallet including a consumer wallet application running on a device of the user;
responsive to the first request, generate the ID token, by the digitization platform;
transmit the generated ID token, by the digitization platform, to the virtual wallet, wherein the generated ID token is presented to a third-party entity by the user device of the user;
receive, by the digitization platform, from the third-party entity, a second request for the personal data corresponding to the ID token, the second request including a digital signature authenticating the request and the third-party entity;
determine, by the digitization platform, a trustworthiness score corresponding to the third-party entity based at least in part on an analysis of entity data corresponding to the third-party entity;
transmit, by the digitization platform, an indication of the trustworthiness score and the second request to the virtual wallet; and
based on receiving from the virtual wallet an indication of acceptance of the second request and encrypted personal data associated with the generated ID token, transmit the encrypted personal data to the third-party entity for processing a transaction.

16. The non-transitory computer readable medium of claim 15, wherein the instructions further cause the processor to:
flag the second request as potentially fraudulent, and
transmit a recommendation to the virtual wallet to deny the second request.

17. The non-transitory computer readable medium of claim 15, wherein the instructions further cause the processor to:
flag the second request as trustworthy, and
transmit a recommendation to the virtual wallet to accept the second request.

18. The non-transitory computer readable medium of claim 15, wherein the instructions further cause the processor to:
receive, from the virtual wallet, a refresh notification corresponding to the generated ID token, the refresh notification including updated personal data associated with the generated ID token;
transmit an update notification to the third-party entity;
receive, from the third-party entity, a confirmation of the update notification; and
transmit the updated personal data associated with the generated ID token to the third-party entity.

19. The non-transitory computer readable medium of claim 15, wherein the instructions further cause the processor to:
receive, from the virtual wallet, a recycle notification corresponding to the generated ID token, the recycle notification including a third request for the third-party entity to delete the personal data associated with the generated ID token;
transmit a delete order to the third-party entity;
receive a deletion confirmation of the personal data by the third-party entity; and
transmit, to the virtual wallet, a deletion notification associated with the generated ID token.

20. The non-transitory computer readable medium of claim 15, wherein the instructions further cause the processor to:

cause a machine learning component to learn patterns in previous second requests of the third-party entity and corresponding indications of acceptance of the second request by the virtual wallet; and use the learned patterns to improve a determination of the trustworthiness score corresponding to the third-party entity.

\* \* \* \* \*